US007218955B2

(12) United States Patent
Aoyama et al.

(10) Patent No.: US 7,218,955 B2
(45) Date of Patent: May 15, 2007

(54) METHOD FOR DECIDING TILT ANGLE OF ANTENNA IN RADIO COMMUNICATION SYSTEM AND APPARATUS FOR DECIDING THE SAME

(75) Inventors: Akio Aoyama, Tokyo (JP); Kojiro Hamabe, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 10/528,070

(22) PCT Filed: Aug. 4, 2004

(86) PCT No.: PCT/JP2004/011152

§ 371 (c)(1),
(2), (4) Date: Mar. 17, 2005

(87) PCT Pub. No.: WO2005/013632

PCT Pub. Date: Feb. 10, 2005

(65) Prior Publication Data

US 2005/0250542 A1 Nov. 10, 2005

(30) Foreign Application Priority Data

Aug. 4, 2003 (JP) ............................ 2003-285731

(51) Int. Cl.
*H04M 1/00* (2006.01)

(52) U.S. Cl. .................... 455/562.1; 455/25; 455/63.1; 455/63.4; 455/67.11; 455/272; 455/423; 455/575.7; 343/757; 342/357.1; 342/367

(58) Field of Classification Search ................ 455/561, 455/562.2, 107, 110, 25, 63.1, 63.4, 67.11, 455/272, 423, 446, 562.1, 575.7; 343/700, 343/757, 878, 880; 342/350, 357.1, 367
See application file for complete search history.

(56) References Cited

U.S. PATENT DOCUMENTS 6,104,936 A * 8/2000 Kronestedt ............... 455/562.1
6,282,434 B1 * 8/2001 Johannisson et al. .... 455/562.1

FOREIGN PATENT DOCUMENTS

| | | | |
|---|---|---|---|
| JP | 2-135884 | A | 11/1990 |
| JP | 10-112681 | | 4/1998 |
| JP | 11-166964 | A | 6/1999 |
| JP | 2000-269723 | | 9/2000 |
| JP | 2001-251134 | A | 9/2001 |
| JP | 2001-095040 | A | 3/2002 |
| JP | 2002-204468 | A | 7/2002 |

OTHER PUBLICATIONS

Kazuo Morita, et al.; "UHF-tai Toshinai Ido Musen Kairo no Sekkeiho"; 1995 Nen The Institute of Electronics, Information and Communication Engineers Sogo Taikai Koen Ronbunshu B-372, 1995 (Cited in the International Search Report).

* cited by examiner

*Primary Examiner*—William Trost
*Assistant Examiner*—James D Ewart
(74) *Attorney, Agent, or Firm*—Dickstein, Shapiro, LLP.

(57) ABSTRACT

The purpose of the present invention is to provide a tilt angle deciding method and a system wherein tilt angles to diminish the deterioration rate of the entire system can be obtained in the radio communication system. The method comprises the steps of setting initial values of tilt angles; calculating the deterioration rate at the initial values of tilt angles; selecting an antenna for reducing a tilt angle; reducing the tilt angle of the selected antenna; calculating a deterioration rate at the time when the tilt angle is reduced; determining the continuity of repeating the processes, after repeating the series of processes for reducing these tilt angles, and increasing tilt angles repeatedly in the similar way. In addition, the method comprises the steps of outputting tilt angles for diminishing a small deterioration rate, and determining whether the processes of repeating the whole steps finish. With the above-specified processes, it becomes possible to obtain tilt angles for diminishing the deterioration rate of the entire system in comparison with that obtained at initial values of tilt angles.

14 Claims, 5 Drawing Sheets

METHOD FOR DECIDING TILT ANGLE OF ANTENNA IN RADIO COMMUNICATION SYSTEM AND APPARATUS FOR DECIDING THE SAME

CROSS-REFERENCE TO RELATED APPLICATIONS

This application is a national stage application under 35 U.S.C. § 371 and claims priority under 35 USC § 365(c) of International Application PCT/JP2003/011152, filed on Aug. 4, 2004, which designated the United States, was published in Japanese, and which in turn claims priority to Japanese Patent Application JP2003-285731, filed on Aug. 4, 2003. The entirety of each of which is incorporated herein by reference.

BACKGROUND OF THE INVENTION

1. Field of the Invention

The present invention relates to a radio communication system including a plurality of base stations and particularly to a method for deciding tilt angles used in deciding a tilt angle of an antenna located in each base station to reduce a deterioration rate of the entire radio communication system, and to an apparatus for deciding the same.

2. Description of the Related Art

Concerning a radio communication system including a plurality of base stations that provide radio communication lines to fixed users and mobile users distributed over a plurality of areas, when constructing such radio communication system or locating an additional radio station in an existing radio communication system, a tilt angle of an antenna having directivity in a vertical plane and located in each base station is decided so that the radio communication system can provide high-quality radio communication lines.

Tilt angles are not decided for all antennas arranged in respective base stations but only for antennas which are considered to be effective for the radio communication system to provide higher-quality radio communication lines if tilt angles thereof are changed from predetermined initial angles. Such antennas are selected and tilt angles of the selected antennas are decided by a person in charge in the following procedures.

First of all, a propagation loss from each antenna to a predetermined point is obtained by a propagation simulator based on information on the location, altitude, building, geography, etc. of the base station. Thereafter, reception power when a signal transmitted from each antenna is received at the predetermined point is calculated based on transmission power from the antenna, orientation of the antenna, a beam pattern of the antenna in horizontal and vertical planes, and the propagation loss obtained earlier. In addition, reception quality represented by S/N (signal-to-noise) ratio or SIR (signal power to interference ratio) is calculated.

Here, the point in which a predetermined value of reception power or reception quality is not satisfied is defined as a "deterioration point."

From the results of the above calculations, a deterioration rate of coverage of each antenna is calculated. Coverage of each antenna is defined as an area where reception power of a signal from each antenna is larger than reception power of a signal from any other antenna and, at the-same time, is a predetermined value or larger. An area to be covered by the radio communication system is divided and allocated to respective radio stations which constitute the radio communication system. Each of the allocated areas serves as the coverage, and the coverage of the whole system is equal to the sum of the coverage of the respective antennas. A deterioration rate is defined as a ratio of the deterioration points within specified coverage.

With the definitions stated above, a deterioration rate of each antenna and a deterioration rate of the entire system are obtained. A display device provided in the propagation simulator displays coverage of each antenna so that deterioration points in the coverage can be recognized. A person in charge of deciding tilt angles of antennas selects antennas whose tilt angles are to be changed based on the displayed content and designates the tilt angles.

FIG. 5 is a view showing adjusting operations for tilt angles of antennas. The tilt angles of antennas 1 and 2, each having a beam pattern, are adjusted to improve deterioration rates (deterioration rates of coverage of respective antennas) X % and Y %, which represent communication qualities within the coverage of the antennas, as well as a deterioration rate of the entire system Z %.

By changing a large tilt angle of an antenna to a smaller angle, in other words, by changing a situation where transmission power is concentrated to an inner side (more front side) than original coverage of the antenna to a situation where transmission power is distributed within the original coverage of the antenna, reception power within the coverage of the antenna tend to increase.

On the contrary, by changing a small tilt angle of an antenna to a larger one, in other words, by changing a situation where sufficient transmission power is distributed within original coverage of the antenna to a situation where transmission power is concentrated to an inner side (more front side) than the original coverage of the antenna, reception power within the coverage of the antenna tends to decrease. As a result, the deterioration rate of the antenna tends to increase. However, in coverage with a sufficiently small deterioration rate, an increase in deterioration rate due to an increase in tilt angle is often very small. In such a case, power which interferes with the coverage of neighboring antennas is reduced, and therefore, in many cases, the deterioration rates of coverage of the neighboring antennas are reduced.

Tilt angles have been decided by a person in charge based on the above described general trends to reduce deterioration rates.

With regard to adjustment of a tilt angle of an antenna, Patent Document 1 (Unexamined Japanese Utility Model Publication No. Hei02-135884) disclosed a calculator which, while searching a target by using an antenna of radar, calculates a tilt angle using a search distance and an installation height of the antenna, and a comparison controller which compares an output from the calculator to a tilt angle signal outputted from the antenna to control the tilt angle.

Patent Document 2 (Unexamined Japanese Patent Publication No. 2002-095040) disclosed that, when designing and adjusting or operating a radio network, operation parameters are decided by using an optimization process so that design and adjustment of a radio network can be done more easily. This Document suggests orientation of an antenna as one of the operation parameters.

Patent Document 3 (Unexamined Japanese Patent Publication No. Hei11-166964) has disclosed a method used when correcting an angle of an antenna with a step tracking system in order to conduct satellite tracking. In this method, an angle of an antenna is corrected by a large step size in the initial correction stage, and the step size is thereafter gradually reduced so that the antenna is oriented in an optimal direction.

Of these techniques stated above, the one described in Patent Document 1 relates to a radar, and there is no description about tilt angle control for antennas with consideration of a deterioration rate of the entire radio communication system having a plurality of antennas.

As for the technique disclosed in Patent Document 2, it is stated that operation parameters including orientation of an antenna are decided by using an optimization process when designing, adjusting and operating a radio network. However, a specific method described therein was only the use of a network optimization process and therefore the content of the method is not clear.

The technique disclosed in Patent Document 3 is for correction of an angle of an antenna with step track system for conducting satellite tracking. Similarly to Patent Document 1, there is no description of tilt angle control for an antenna with consideration of a deterioration rate of the entire radio communication system.

Patent Document 1: Unexamined Japanese Utility Model Publication No. Hei02-135884

Patent Document 2: Unexamined Japanese Patent Publication No. 2002-095040

Patent Document 3: Unexamined Japanese Patent Publication NO. Heisei 11-166964

As described earlier, a person in charge selects antennas for changing tilt angels in a radio communication system and decides the tilt angles thereof with consideration of a propagation environment. However, the results vary depending on experience of the person in charge, and a deterioration rate of the entire system therefore becomes inconsistent. Accordingly, a stable quality cannot be maintained. Moreover, selecting antennas from many of them and deciding their angles have been time-consuming operations.

Furthermore, when deciding a tilt angle, a tilt angle of the same antenna is sometimes changed more than once and propagation simulation is carried out each time the tilt angle is changed. At this time, if an angle is changed largely, the angle may exceed an optimal value and be far from it, whereas a small degree of angle change requires a number of angle changes. Therefore, it is important to set a degree for an angle change carried out in adjusting an angle.

It has been very difficult to obtain tilt angles which enable sufficiently small deterioration rate of the entire system within a limited period of time particularly in a large radio communication system where an enormous number of antennas are located.

Moreover, where an antenna with a certain tilt angle interferes with a neighboring area, affecting optimal tilt angles of other antennas, in other words, in the case of a radio communication system where antennas are affecting each other (for example, CDMA (Code Division Multiple Access)), optimization of tilt angles has been even more difficult. Since antennas affect each other, if one of the antennas is adjusted, the adjustment result affects other antenna, requiring further adjustment of the affected antenna. Further, adjustment of an antenna does not always affect the neighboring area only, making the optimization even more difficult. Therefore, it has been very difficult to obtain tilt angles which enable a sufficiently small deterioration rate of the entire system.

SUMMARY OF THE INVENTION

The present invention has been accomplished in the light of the foregoing problems of the conventional techniques, and an object thereof is to provide a method for deciding tilt angles which enable a sufficiently small deterioration rate of the entire radio communication system. Another object of the present invention is to provide a method for deciding tilt angles, which makes it possible to obtain consistent tilt angles that realize a sufficiently small deterioration rate of the entire radio communication system in the same radio communication system without regard to the operator.

A method for deciding tilt angles of antennas of a radio communication system according to the present invention is a method for deciding tilt angles of antennas having directivity in a vertical plane, the antennas being provided in a plurality of radio base stations which constitute a radio communication system, the method comprising: a first step of selecting an antenna whose tilt angle is to be reduced; a second step of calculating a deterioration rate of the entire system when a tilt angle of the antenna selected in the first step is reduced, said deterioration rate being calculated at least once after a tilt angle is changed; a third step of selecting an antenna whose tilt angle is to be increased; a fourth step of calculating a deterioration rate of the entire system when a tilt angle of the antenna selected in the third step is increased, said deterioration rate being calculated at least once after a tilt angle is changed; and a fifth step of outputting tilt angles realizing the smallest deterioration rate among the deterioration rates of the entire system calculated in the second step and the fourth step.

In this case, the method may further comprise: a sixth step of determining whether processes of the first step and the second step are to be repeated, the sixth step being performed after the first step and the second step; a seventh step of determining whether processes of the third step and the fourth step are to be repeated, the seventh step being performed after the third step and the fourth step; and an eighth step of determining whether processes of the first step to the seventh step are to be repeated, the eighth step being performed after the first step to the seventh step.

Moreover, the method may further comprise: a ninth step of changing a step angle used for changing a tilt angle in the second step in accordance with an accumulated number of repetitions of the processes of the first step to the seventh step if it is determined in the eighth step that the processes of the first step to the seventh step are to be repeated, the ninth step being performed right before the first step.

Further, the method may further comprise: a tenth step if changing a step angle used for changing a tilt angle in the fourth step in accordance with an accumulated number of repetitions of the processes of the first step to the seventh step if it is determined in the eights step that the processes of the first step to the seventh step are to be repeated, the tenth step being performed right before the third step.

Furthermore, in this method, one of or both of the first step of selecting an antenna whose tilt angle is to be reduced and the third step of selecting an antenna whose tilt angle is to be increased select antennas based on deterioration rates of coverage of the antennas.

An apparatus for deciding tilt angles of antennas of a radio communication system according to the present invention is an apparatus for deciding tilt angles of antennas having directivity in a vertical plane, the antennas being provided in a plurality of radio base stations which constitute a radio communication system, the apparatus comprising: first antenna selecting means for selecting an antenna whose tilt angle is to be reduced; second antenna selecting means for selecting an antenna whose tilt angle is to be increased; deterioration rate calculating means for calculating a deterioration rate of the entire system after a tilt angle of the antenna selected by the first antenna selecting means or the second antenna selecting means is changed, said deterioration rate being calculated at least once after a tilt angle is changed; data storage means for storing the deterioration rate calculated by the deterioration rate calculating means and tilt angles associated therewith; and means for outputting tilt angles realizing the smallest deterioration rate of the entire system from data of the tilt angles and deterioration rates stored in the data storage means.

In this case, one of or both of the first antenna selecting means and the second antenna selecting means may select antennas based on deterioration rates of coverage of the antennas.

Moreover, the apparatus may further comprise: process switching means for outputting information on switching among an operation by the first antenna selecting means, an operation by the second antenna selecting means, and termination of processes; a switching frequency counter for counting the information on switching outputted from the process switching means; and means for setting tilt angle change parameters which changes a degree of tilt angle change for an antenna selected by the first antenna selecting means or the second antenna selecting means once frequency of switching counted by the switching frequency counter is a predetermined number or larger.

In the present invention constructed as above, selection of antennas is carried out separately for tilt angle reduction and tilt angles increase as the first step and the third step, respectively, a deterioration rate of the entire system is calculated after tilt angles are changed for respective antennas, and tilt angles are decided based on the calculated deterioration rate of the entire system. Since the selection of antennas for tilt angle adjustments is carried out separately for increasing direction and reducing direction, results of such adjustments differ from each other depending on a choice of antenna selection criteria. Thus, a large degree of freedom is obtained.

Furthermore, where a tilt angle of an antenna is decided and then a different antenna is selected to set its tilt angle, an antenna at a certain tilt angle interferes with its neighboring area, affecting optimum tilt angles of other antennas in a radio communication system. Even in such a radio communication system, the present invention enables tilt angles of respective antennas to realize a sufficiently small deterioration rate of the entire system.

The first advantageous effect of the present invention is that one can obtain tilt angles which enable a small deterioration rate of the entire system compared with that obtained from initial values of tilt angles.

The second advantageous effect is that, by automating the way to decide tilt angles, any operator can obtain the same result of optimal tilt angles regardless of operator's experience if initial setting is the same.

The third advantageous effect is that one can decide tilt angles more quickly and more accurately.

DESCRIPTION OF THE PREFERRED EMBODIMENTS

Next, embodiments of the present invention are detailed with reference to the drawings.

Figure 1:
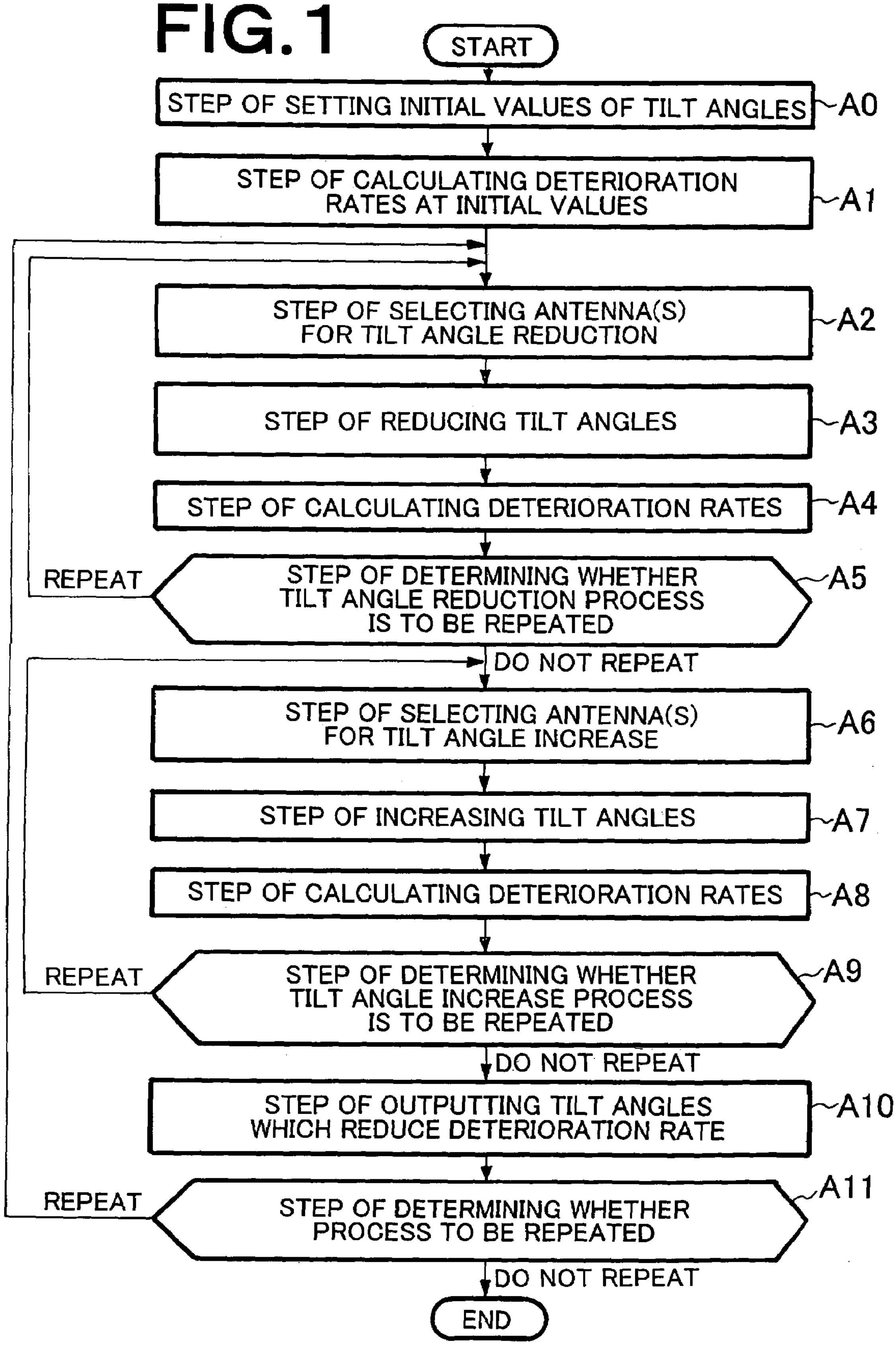
FIG. 1 is a process flowchart of a first embodiment of the present invention.

FIG. 1 is a flowchart showing a process of a method for deciding tilt angles carried out in the first embodiment of the present invention. This embodiment is a process carried out for deciding tilt angles of antennas in a radio communication system, like a CDMA cellular system, which includes a plurality of radio base stations, each having an antenna with directivity in a vertical plane.

A deterioration rate of each antenna is calculated by a simulator having a simulation function.

The process according to the present embodiment includes steps A0 to A11 described below.

The process includes a step of setting initial values of tilt angles (Step A0), a step of calculating a deterioration rates at the initial values of tilt angles (step A1), a step of selecting antenna(s) for tilt angle reduction based on a predetermined evaluation index (Step A2), a step of reducing tilt angles of the selected antenna(s) (Step A3), a step of calculating a deterioration rates when tilt angles are reduced (Step A4), a step of determining whether the process of repeatedly reducing tilt angles conducted between Steps A2 and A4 is to be repeated (Step A5), a step of selecting antenna(s) for tilt angle increase based on a predetermined evaluation index (Step A6), a step of increasing tilt angles of the selected antenna(s) (Step A7), a step of calculating deterioration rates when tilt angles are increased (Step A8), a step of determining whether the process of repeatedly increasing tilt angles conducted between Steps A6 and A8 is to be repeated (Step A9), a step of outputting tilt angles which reduce deterioration rates (Step A10), and a step of determining whether the process conducted between Steps A2 to A10 is to be repeated (Step A11).

Operations of the present embodiment are described, starting from the step of setting initial values of tilt angles (Step A0).

In a radio communication system including a plurality of radio base stations, each having an antenna with directivity in a vertical plane, if no operation for optimizing tilt angles has been conducted, certain initial values of tilt angles have usually been set. In such a case, these tilt angles are set as initial values in Step A0. The initial values can be set to arbitrary angles. However, if initial tilt angles have not been set yet, the initial angles can be, for example, angles obtained when the peak of a beam pattern within a vertical plane is oriented to a point which divides a distance between base stations into two equal parts. Thereafter, deterioration rates are calculated from the initial values set in Step A0 (Step A1).

Steps A2 to A5 are carried out with consideration of the foregoing characteristic. This characteristic is that reception power within coverage of an antenna tends to increase by changing a large tilt angle of an antenna to a small one, in other words, by changing a situation where transmission power is concentrated to an inner side (more front side) than an original coverage of an antenna to a situation where transmission power is distributed within the original coverage of the antenna,.

The step of selecting antennas for tilt angle reduction (Step A2) is described. In this step, antennas whose tilt angles are to be reduced are selected based on a predetermined evaluation index.

There are several examples of the predetermined evaluation index. The predetermined evaluation index used here as an example is a deterioration rate of coverage of each antenna at a tilt angle obtained at a point when Step A2 is carried out. Further, this evaluation index may be weighted by importance of coverage.

Subsequently, "antenna(s) whose coverage deterioration rates are a predetermined value or larger" are selected as antenna(s) whose tilt angles are to be decreased. Alternatively, "a predetermined number of the antennas having larger coverage deterioration rates than the other antennas" are selected as antennas whose tilt angles are to be decreased.

Next, the step of reducing tilt angles (Step A3) is described. In this step, tilt angle(s) of one or more antennas selected in Step A2 are reduced. While reducing the tilt angles, each tilt angle is changed by a constant degree (for example, 1 degree).

Next, the step of calculating deterioration rates (Step A4) is described. In this step, calculated are coverage deterioration rates of antennas after tilt angles thereof are reduced in Step A3, as well as a deterioration rate of the entire system.

Next is a description of the step of determining whether the process of tilt angle reduction is repeated (Step A5). In this step, it is determined whether or not the series of processes in Steps A2, A3 and A4 are to be repeated. As for the criteria of the determination, if the deterioration rate of the entire system obtained in Step A4 is the same as or larger than a previously-decided given deterioration rate, Steps A2, A3 and A4 are repeated. If the deterioration rate of the entire system obtained in Step A4 is smaller than the given "deterioration rate of the entire system," Steps A2, A3 and A4 are no longer repeated and the process proceeds to the next step.

The processes in Steps A2, A3 and A4 are carried out for all the antenna(s) selected in step A2. Therefore, the processes in Steps A2, A3 and A4 are repeated until the "deterioration rate of the entire system" becomes smaller than a predetermined value after the changes of tilt angles of the "antenna(s) whose coverage deterioration rates are a predetermined value or larger" or the "a predetermined number of the antennas having larger coverage deterioration rates than the other antennas."

The criteria of the determination in Step A5 may also be a combination of the number of repetitions of Steps A2, A3 and A4 and the foregoing criteria. Even where the deterioration rate of the entire system obtained in Step A4 is the same as or above the given deterioration rate, the repetition of Steps A2, A3, and A4 is terminated if the number of the repetition is the same as or larger than a given number. This can limit time for the processes of repeated Steps A2, A3 and A4.

Steps A6 to A9 are carried out with consideration of the following characteristics. This characteristic is that, as described earlier, reception power within coverage of an antenna tends to decrease by changing a small tilt angle of an antenna to a larger one, in other words, by changing a situation where sufficient transmission power is distributed within original coverage of an antenna to a situation where transmission power is concentrated to an inner side (more front side) than the original coverage of the antenna. As a result, the deterioration rate of the antenna tends to increase. However, in the coverage with a sufficiently small deterioration rate, an increase in deterioration rate due to an increase in tilt angle is often very small. In such a case, power which interferes with the coverage of neighboring antennas is reduced, and therefore, in many cases, the deterioration rates of coverage of the neighboring antennas are reduced.

As for the step of selecting antenna(s) for tilt angle increase (Step A6), the step of increasing tilt angles (Step A7), the step of calculating a coverage deterioration rate of each antenna whose tilt angle has been increased and a deterioration rate of the entire system (Step A8), a repeating process of repeated Steps A6, A7 and A8, and the step of determining whether the repeated processes are to be repeated again (Step A9), the processes thereof are the same as those of foregoing Steps A2, A3, A4 and A5 except for the direction of tilt angle change (increasing direction or decreasing direction). However, the evaluation index used in selecting antenna(s) for tilt angle changes, a predetermined constant degree for tilt angle changes, and the like are to be set independently of the process of reducing tilt angles.

For example, as for an evaluation index used in selecting antenna(s) whose tilt angles are to be changed, used is a coverage deterioration rate of each antenna at a tilt angle obtained when Step A6 is carried out. Further, the evaluation index may be weighted by importance of coverage.

Thereafter, "antenna(s) whose coverage deterioration rates are a predetermined value or smaller" are selected as antenna(s) whose tilt angles are to be increased. Alternatively, "a predetermined number of the antennas having smaller coverage deterioration rates than the other antennas" are selected as antennas whose tilt angles are to be increased.

The step of selecting antenna(s) for tilt angle increase (Step A6) is described. In this step, antenna(s) whose tilt angles are to be increased are selected based on the predetermined evaluation index.

There are some examples of the predetermined evaluation index. The predetermined evaluation index used here as an example is a coverage deterioration rate of each antenna at a tilt angle obtained when Step A6 is carried out. Further, the evaluation index may be weighted by importance of coverage.

Thereafter, "antenna(s) whose coverage deterioration rates are a predetermined value or smaller" are selected as antenna(s) whose tilt angles are to be increased. Alternatively, "a predetermined number of the antennas having smaller coverage deterioration rates than the other antennas" are selected as antennas whose tilt angles are to be increased.

Next, the step of increasing tilt angles (Step A7) is described. In this step, the tilt angles of one or more antenna(s) selected in Step A6 are increased. While increasing the tilt angles, each tilt angle is changed by a constant degree (for example, 1 degree).

Next, the step of calculating deterioration rates (Step A8) is described. In this step, calculated are coverage deterioration rates of antennas and a deterioration rate of the entire system after tilt angles are increased in step A3.

Next is a description of the step of determining whether the process of tilt angle increase is repeated (Step A9). In this step, it is determined whether or not the series of processes in Steps A6, A7 and A8 are to be repeated. As for the criteria of the determination, if the deterioration rate of the entire system obtained in Step A8 is the same as or larger than a previously-decided given deterioration rate, Steps A6, A7 and A8 are repeated. If the deterioration rate of the entire system obtained in Step A8 is smaller than the given "deterioration rate of the entire system," Steps A6, A7 and A8 are no longer repeated and the process proceeds to the next step. The predetermined deterioration rate used in Step A9 may and may not be the same as the predetermined deterioration rate used in Step A5.

The processes in Steps A6, A7 and A8 are carried out for all the antenna(s) selected in step A6. Therefore, the processes in Steps A6, A7 and A8 are repeated until the "deterioration rate of the entire system" becomes smaller than a predetermined value after the changes of tilt angles of the "antenna(s) whose coverage deterioration rates are a predetermined value or smaller" or the "a predetermined number of the antennas having smaller coverage deterioration rates than the other antennas."

The criteria of the determination in Step A9 may also be a combination of the number of repetitions of Steps A6, A7 and A8 and the foregoing criteria. Even where the deterioration rate of the entire system obtained in Step A8 is the same as or above given deterioration rate, the repetition of Steps A6, A7, and A9 is terminated if the number of the repetitions is the same as or larger than a given number. This can limit time for the processes of repeated Steps A6, A7 and A8.

Next, the step of outputting tilt angles which reduce a deterioration rate (Step A10). In this step, the output is tilt angles of each antenna finally set in Step A3 or A7, in other words, tilt angles which enable the minimum deterioration rate of the entire system, among the tilt angles which have been set for the respective antennas.

Next, the step of determining whether to repeat the process (Step A11) is described. In this step, it is determined whether or not the series of processes from foregoing Steps A2 to A10 are to be repeated. As for the criteria of the determination, the deterioration rate of the entire system at the tilt angles of the respective antennas outputted in Step A10 is obtained, and repetition of Steps A2 to A10 is continued if the value of the deterioration rate is a predetermined value or larger. If the value of the deterioration rate is smaller than the predetermined value, the repetition is terminated. The predetermined deterioration rate used in Step A11 may and may not be the same as the predetermined deterioration rate used in Step A5. Moreover, the predetermined deterioration rate used in Step A11 may or may not be the same as the predetermined deterioration rate used in Step A9.

The criteria of the determination in Step A11 may also be a combination of the number of repetitions of the series of processes of Steps A2 to A10 and the foregoing criteria.

Next, a construction of an apparatus according to the present invention is described with reference to FIG. 2.

Figure 2:
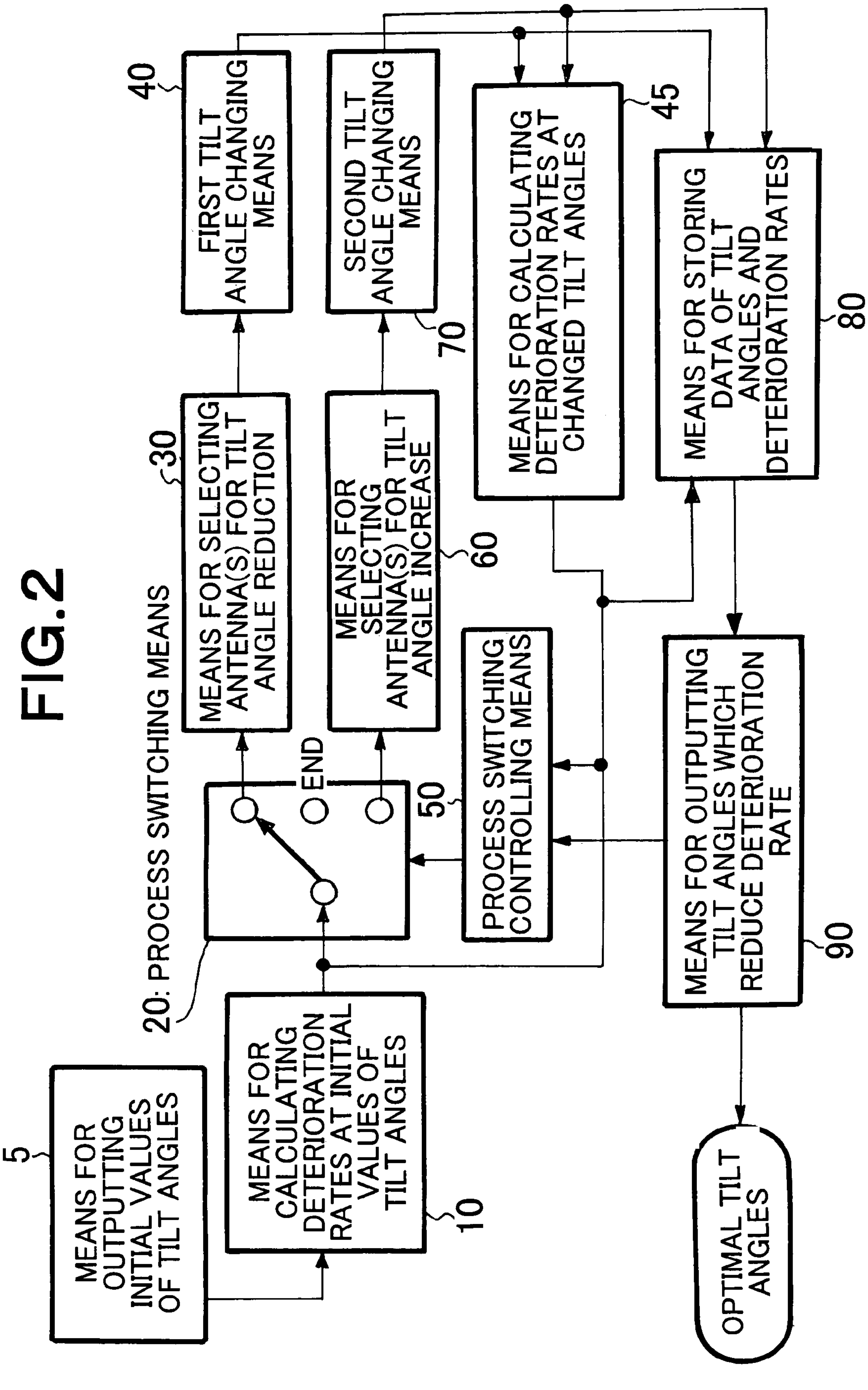
FIG. 2 is a system view of the first embodiment of the present invention.

FIG. 2 is a block diagram showing the construction of an apparatus which carries out the processes shown in the flowchart of FIG. 1. This apparatus is for deciding tilt angles of antennas located in plurality of radio base stations included in a radio communication system, each antenna having directivity in a vertical plane. This apparatus is for deciding tilt angles of a plurality of antennas and the operation thereof can be realized by a general-purpose computer. Therefore, the installation location of the apparatus is not particularly limited. Each antenna is set at the tilt angle decided by this apparatus, and the setting of tilt angles can be done manually. Alternatively, an angle controller, which controls tilt angles of antennas in accordance with outputs of the apparatus, may be provided in each radio station, and tilt angles of antennas can be automatically set by providing the outputs of the apparatus to the angle controller.

As shown in FIG. 2, the apparatus for deciding tilt angles according to the present invention includes: means 5 for outputting initial values of tilt angles; "means 10 for calculating deterioration rates at the initial values of tilt angles" which calculates and outputs the deterioration rates at the above-mentioned initial values of tilt angles; process switching means 20 for switching to a process of increasing or decreasing tilt angles, or to termination of the processes; "means 30 for selecting antenna(s) for tilt angle reduction" which selects the antenna(s) having tilt angles to be reduced based on the inputted deterioration rates; "means 60 for selecting antenna(s) for tilt angle increase" which selects antenna(s) having tilt angles to be increased based on the inputted deterioration rates; a first tilt angle changing means 40 for reducing the tilt angles of the selected antenna(s) by a constant degree; a second tilt angle changing means 70 for increasing the tilt angles of the selected antenna(s) by a constant degree; means 45 for calculating deterioration rates at the changed tilt angles; process switching controlling means 50 for controlling the operation of the process switching means 20 in accordance with the value of a deterioration rate of the entire system or the frequency of inputting a deterioration rate of the same; "means 80 for storing data of tilt angles and deterioration rates" which stores data of inputted tilt angles and deterioration rates; and means 90 for outputting optimal tilt angle of each antenna based on the outputs from the means 80 for storing data of tilt angles and deterioration rates.

First of all, the means 5 for outputting initial values of tilt angles is described. This means performs a process similar to that of Step A0 described earlier and outputs initial values of tilt angles.

The means 10 for calculating deterioration rates at the initial values of tilt angles is described. The means 10 for calculating deterioration rates at the initial values of tilt angles receives tilt angles outputted from the means 5 for outputting initial values of tilt angles, and calculates coverage deterioration rates of the respective antennas at the inputted tilt angles as well as a deterioration rate of the entire system. A method of calculating these deterioration rates is similar to that of Step A1. Thereafter, the means 10 outputs the abovementioned deterioration rates, its calculation results, to the process switching means 20.

The process switching means 20 receives the information outputted from the process switching controlling means 50 as an input. In accordance with this input, the process switching means 20 then switches an output destination of separately-inputted deterioration rates between the means 30 for selecting antenna(s) for tilt angle reduction and the means 60 for selecting antenna(s) for tilt angle increase. Otherwise, the process switching means 20 ends the processes without outputting the deterioration rates to any of them and terminates the processes.

The deterioration rates separately inputted to the process switching means 20 are information on coverage deterioration rates of the respective antennas and a deterioration rate of the entire system, provided from the means 10 for calculating deterioration means at initial values of tilt angles or the means 45 for calculating deterioration rates at changed tilt angles.

By using the coverage deterioration rates of the respective antennas inputted from the process switching means 20, the means 30 for selecting antenna(s) for tilt angle reduction selects antenna(s) whose tilt angles are to be reduced, and provides information on the selected antenna(s) to the first tilt angle changing means 40. The operation of the selection base on an evaluation index is the same as that of Step A2 described earlier.

The means 60 for selecting antenna(s) for tilt angle increase is different from the means 30 for selecting antenna(s) for tilt angle reduction in that the means 60 selects antenna(s) whose tilt angles are to be increased. Information on the antenna(s) selected here is provided to the second tilt angle changing means 70.

The first tilt angle changing means 40 receives the information on antenna(s), the information outputted from the means 30 for selecting antenna(s) for tilt angle reduction, as an input. The first tilt angle changing means 40 then reduces the tilt angles of the selected antenna(s) by a predetermined degree and provides the value of the reduced tilt angle to the means 45 for calculating deterioration rates at changed tilt angles and to the means 80 for storing data of tilt angles and deterioration rates.

The second tilt angle changing means 70 is different from the first tilt angle changing means 40 in the direction of tilt angle change. In other words, the second tilt angle changing means 70 receives the information on the antenna(s), the information inputted from the means 60 for selecting antenna(s) for tilt angle increase, as an input. The second tilt angle changing means 70 then increases the tilt angles of the selected antenna(s) by a predetermined degree and provides the values of the increased tilt angles to the means 45 for calculating deterioration rates at changed tilt angles and to the means for storing data of tilt angles and deterioration rates 80.

The process switching controlling means 50 receives coverage deterioration rates of the respective antennas and a deterioration rate of the entire system, both being outputted from the means 45 for calculating deterioration rates at changed tilt angles, as an input. The process switching controlling means 50 does not perform switching if the deterioration rate of the entire system is the same as or larger than a predetermined value so that the current process will continue. If the deterioration rate of the entire system is smaller than the predetermined value, the process switching controlling means 50 performs switching and provides a control signal to the process switching means 20 so that the current process moves to the next process. At this point, the switching operation may be performed based on not only the deterioration rate of the entire system but also a frequency of inputting a deterioration rate of the entire system. In other words, if the frequency of inputting a deterioration rate of the entire system is a predetermined number or larger, the process switching controlling means 50 provides a control signal to the process switching means 20 to perform switching. Once the frequency of switching reaches a predetermined number or larger, the process switching controlling means 50 provides a control signal for terminating the process.

Further, the process switching controlling means 50 receives the deterioration rate of the entire system, an output from the means 90 for outputting tilt angles which reduce a deterioration rate, as an input. If the deterioration rate of the entire system is a predetermined value or smaller, the process switching controlling means 50 provides the process switching means 20 with a control signal for termination of the process.

The means 80 for storing data of tilt angles and deterioration rates receives information on tilt angles outputted from the first and second tilt angle changing means 40 and 70, and coverage deterioration rates of the respective antennas and a deterioration rate of the entire system, both being outputted from the means 45 for calculating deterioration rates at changed tilt angles, as inputs. Thereafter, the means 80 for storing data of tilt angles and deterioration rates stores data of information on tilt angles and a deterioration rate of the entire system among those inputs and provides the information on the tilt angles and the deterioration rate of the entire system to the means 90 for outputting tilt angles which reduce a deterioration rate.

The data of tilt angles and a deterioration rate of the entire system outputted from the means 80 for storing data of tilt angles and deterioration rates is outputted by the means 90 for outputting tilt angles which reduce a deterioration rate as optimal tilt angles which minimize a deterioration rate of the entire system. Moreover, the means 90 for outputting tilt angles which reduce a deterioration rate provides the process switching controlling means 50 with information on the deterioration rate of the entire system at the optimal tilt angles.

Next, specific operations of the present embodiment are described in detail.

First of all, the means 5 for outputting initial values of tilt angles provides initial values of tilt angles to the means 10 for calculating deterioration rates at initial values of tilt angles. The means 10 for calculating deterioration rates at initial values of tilt angles then provides the process switching means 20 with calculated coverage deterioration rates of the respective antennas and a deterioration rate of the entire system.

The process switching means 20 provides these provided deterioration rates to either the means 30 for selecting antenna(s) for tilt angle reduction or the means 60 for selecting antenna(s) for tilt angle increase. For example, where these deterioration rates are provided to the means 30 for selecting antenna(s) for tilt angle reduction, the means 30 for selecting antenna(s) for tilt angle reduction selects antenna(s) based on the coverage deterioration rates of the respective antennas that have been provided thereto, and then provides information on the selected antenna(s) to the first tilt angle changing means 40. The first tilt angle changing means 40 reduces tilt angles of the selected antenna(s) by a constant degree and provides the changed tilt angles to the means 45 for calculating deterioration rates at changed tilt angles and the means 80 for storing data of tilt angle and deterioration rates.

The means 45 for calculating deterioration rates at changed tilt angles calculates coverage deterioration rates of the respective antennas and a deterioration rate of the entire system based on the tilt angles and provides the calculated deterioration rates to the process switching means 20, the process switching controlling means 50, and the means 80 for storing data of tilt angles and deterioration rates.

The process switching controlling means 20 again provides the means 30 for selecting antenna(s) for tilt angle reduction with the coverage deterioration rates of the respective antennas and the deterioration rate of the entire system, which have been provided by the means for calculating deterioration rates at changed tilt angles. This re-supplying operation by the process switching means 20 is carried out under the control of the process switching controlling means 50.

The process switching controlling means 50 provides the process switching means 20 with a switching control signal based on a value of a deterioration rate of the entire system or frequency of inputting a deterioration rate of the entire system. Based on the control signal from the process switching controlling means 50, the process switching means 20 switches a destination of coverage deterioration rates of the respective antennas and a deterioration rate of the entire system from the means 30 for selecting antenna(s) for tilt angle reduction to the means 60 for selecting antenna(s) for tilt angle increase. Where frequency of outputting a switching control signal reaches a predetermined number, the process switching controlling means 50 provides the process switching means 20 with a control signal for ending the process.

The means 80 for storing data of tilt angles and deterioration rates stores the inputted data of tilt angles, coverage deterioration rates of the respective antennas, and a deterioration rate of the entire system and provides the tilt angles and the deterioration rate of the entire system to the means for outputting tilt angles which reduce a deterioration rate 90. The means 90 for outputting tilt angles which reduce a deterioration rate outputs not only optimum tilt angles but also a deterioration rate of the entire system obtained at the optimum tilt angles. The deterioration rate of the entire system obtained at the optimum tilt angles is provided to the process switching controlling means 50. If the deterioration rate of the entire system is a predetermined value or lower, the process switching controlling means 50 provides the process switching means 20 with a control signal for ending the process. The process switching means 20 ends the process in accordance with the control signal for ending the process.

Next, working effects of the first embodiment of the present invention are described.

In the first embodiment of the present invention, a deterioration rate of the entire system at initial values of tilt angles are calculated, and a deterioration rate of the entire system at changed tilt angles is further calculated after tilt angles are changed so that tilt angles which reduce a deterioration rate of the entire system is outputted. Therefore, it is possible to obtain tilt angles at which a deterioration rate of the entire system becomes smaller than that obtained at initial values of tilt angles.

Moreover, as for a method of changing tilt angles, there are two separate simple steps of increasing and reducing tilt angles and these steps are repeated. Therefore, this process can be done by a computer, and this method is thus suitable for automating tilt angle adjustment. In a conventional method, an operator changes tilt angles to a predicted optimal angles at once while estimating a propagation environment and tries many different tilt angles using a propagation simulator. In this embodiment, unlike this conventional method, tilt angles are changed repeatedly by a constant degree whereby one can realize tilt angles close to optimum tilt angles while minimizing an influence on a deterioration rate of the entire system.

Moreover, in this embodiment, selection of antenna(s) for tilt angle change, which has been carried out by an operator based on his/her experience, is realized by using a predetermined evaluation index. Therefore, antenna(s) to be adjusted can be selected automatically. This shows that the present embodiment saves a lot of time and effort in deciding tilt angles.

Further, since each step is operated based on a predetermined evaluation index, there is no operation based on an empirical decision. Therefore, any result obtained can have certain reliability. In other words, where the constant evaluation index and initial parameters are set in a radio communication system, the embodiment of the present invention enables constant non-empirical results to be obtained.

Furthermore, when reducing tilt angles, "antenna(s) whose coverage deterioration rates are a predetermined value or larger" or "a predetermined number of the antennas having larger coverage deterioration rates than the other antennas" are selected. Specifically, by selecting antenna(s) in this manner, only the tilt angles of antenna(s) having large coverage deterioration rates are reduced. Once tilt angles are reduced, reception power within the coverage of these antennas tends to increase, and the deterioration rates of these antennas are thus reduced. In this manner of selection, antennas having small coverage deterioration rates are not selected. Since the tilt angles of the antennas having small coverage deterioration rates are not reduced, power of interference wave towards the coverage of neighboring antennas is not increased, preventing increases in the deterioration rates of the neighboring antennas. Accordingly, large deterioration rates of coverage of antennas are reduced, and antennas with small coverage deterioration rates do not allow the coverage deterioration rates of other antennas to increase, thereby decreasing a deterioration rate of the entire system.

On the other hand, when increasing tilt angles, "antenna(s) whose coverage deterioration rates are a predetermined value or smaller" or "a predetermined number of the antennas having smaller coverage deterioration rates than the other antennas" are selected. Specifically, by selecting antenna(s) in this manner, only the tilt angles of antenna(s) having small coverage deterioration rates are increased. Once tilt angles are increased, reception power within the coverage of these antennas decreases and the deterioration rates of these antennas thus tend to increase. However, in the coverage with sufficiently small deterioration rate, such increase in deterioration rate is often very small. Meanwhile, the power which interferes with the coverage of neighboring antennas is reduced, which often results in reductions in deterioration rates of the neighboring antennas. Accordingly, it is somewhat often the case that, as a whole, the reduced amount of coverage deterioration rates of the neighboring antennas is larger than the increased amount in coverage deterioration rates of antennas whose tilt angles have been increased.

When deciding tilt angles, antennas effective for reducing a deterioration rate of the entire system are selected from a number of antennas and tilt angles thereof are changed in the foregoing manner whereby a deterioration rate of the entire system can be reduced further.

Next, a second embodiment of the present invention is described in detail with reference to the drawings.

Figure 3:
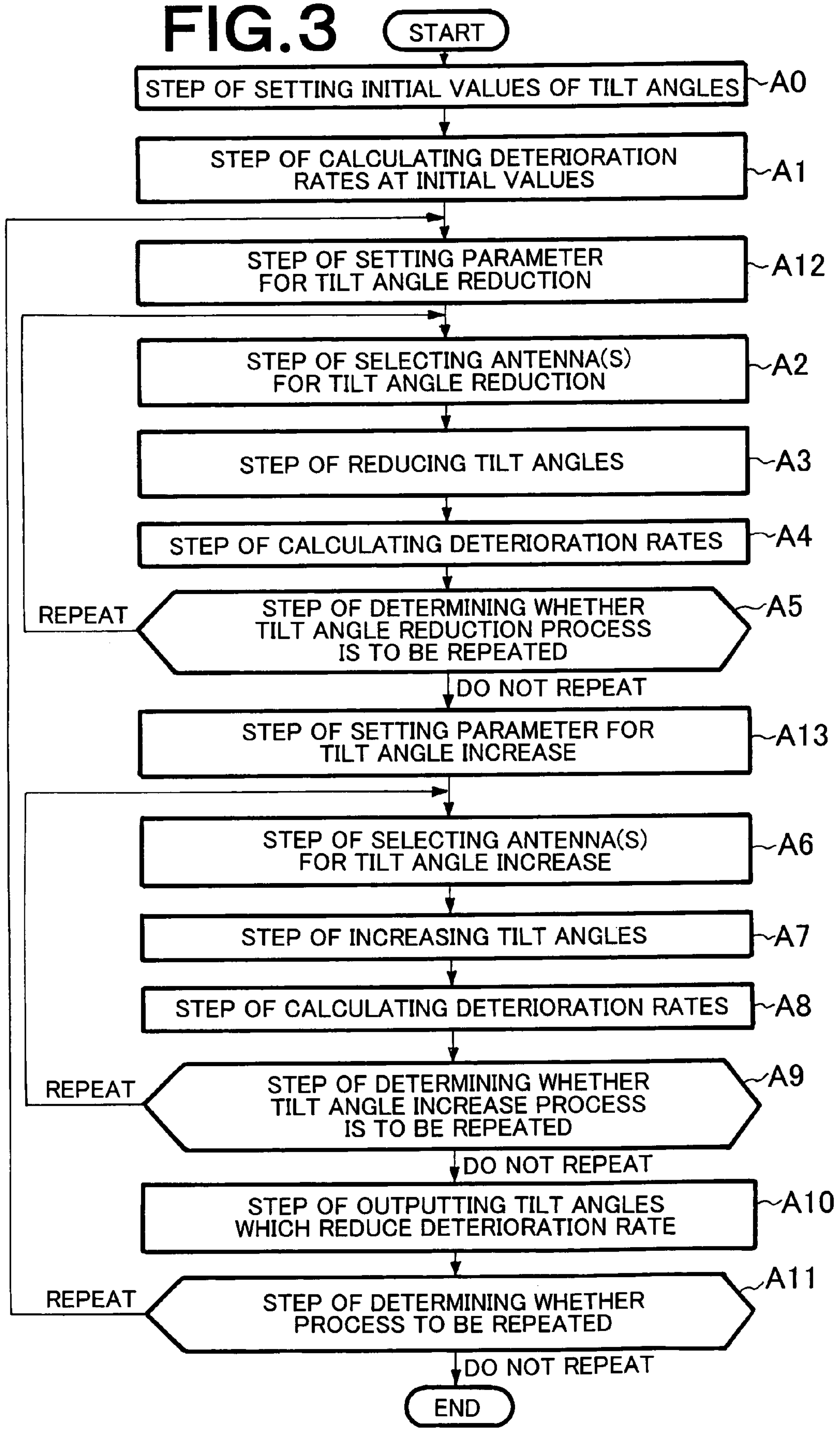
FIG. 3 is a process flowchart of a second embodiment of the present invention.

FIG. 3 is a flowchart showing the operations of the second embodiment of the present invention. In the present embodiment, a step of setting a parameter for tilt angle reduction (Step A12) in accordance with an accumulated number of repetitions of the entire process is added between Steps A1 and A2 in the flowchart of FIG. 1 showing the operations of the first embodiment, and a step of setting a parameter for tilt angle increase (Step A13) in accordance with an accumulated number of repetitions of the entire process is added between Steps A5 and A6 of the same.

As stated below, the step of setting a parameter for tilt angle reduction (Step A12) sets a parameter for tilt angle changes used in the step for reducing tilt angles (Step A3) in accordance with the number of times that "the entire repeated processes," i.e. the series of Steps A12, A2, A3, A4, A5, A13, A6, A7, A8, A9, A10 and A11 has been repeated.

In the first process, the step of setting a parameter for tilt angle reduction (Step A12) sets a constant degree (for example, 1.0 degree) as a changed amount for each tilt angle reduction. From the second process, a range of tilt angle change is set between a tilt angle that has realized the smallest deterioration rate of the entire system so far and a tilt angle that has realized the second smallest deterioration rate of the entire system, a changed amount for each tilt angle reduction is set to a half of the degree set in the previous Step A12 (for example, 0.5 degrees). Moreover, the step of reducing tilt angles (Step A3) reduces tilt angles by a degree and within a range according to a set tilt angle change parameter.

Similarly to the step of setting a parameter for tilt angle reduction (Step A12) and as stated below, the step of setting a parameter for tilt angle increase (Step A13) sets a parameter for tilt angle changes used in the step of increasing tilt angles (Step A7) in accordance with the number of times that "the entire repeated processes," i.e. the series of Steps A12, A2, A3, A4, A5, A13, A6, A7, A8, A9, A10 and A11 has been repeated.

In the first process, the step of setting a parameter for tilt angle increase (Step A13) sets a constant degree (for example, 1.0 degree) as a changed amount for each tilt angle increase. From the second process, a range of tilt angle change is set between a tilt angle that has realized the smallest deterioration rate of the entire system so far and a tilt angle that has realized the second smallest deterioration rate of the entire system, a changed amount made for each tilt angle increase is set to a half of the degree set in the previous Step A13 (for example, 0.5 degrees). The step of increasing tilt angles (Step A7) increases tilt angles by a degree and within a range according to a set tilt angle change parameter.

Next, the construction of the second embodiment of the present invention is described in detail with reference to FIG. 4.

Figure 4:
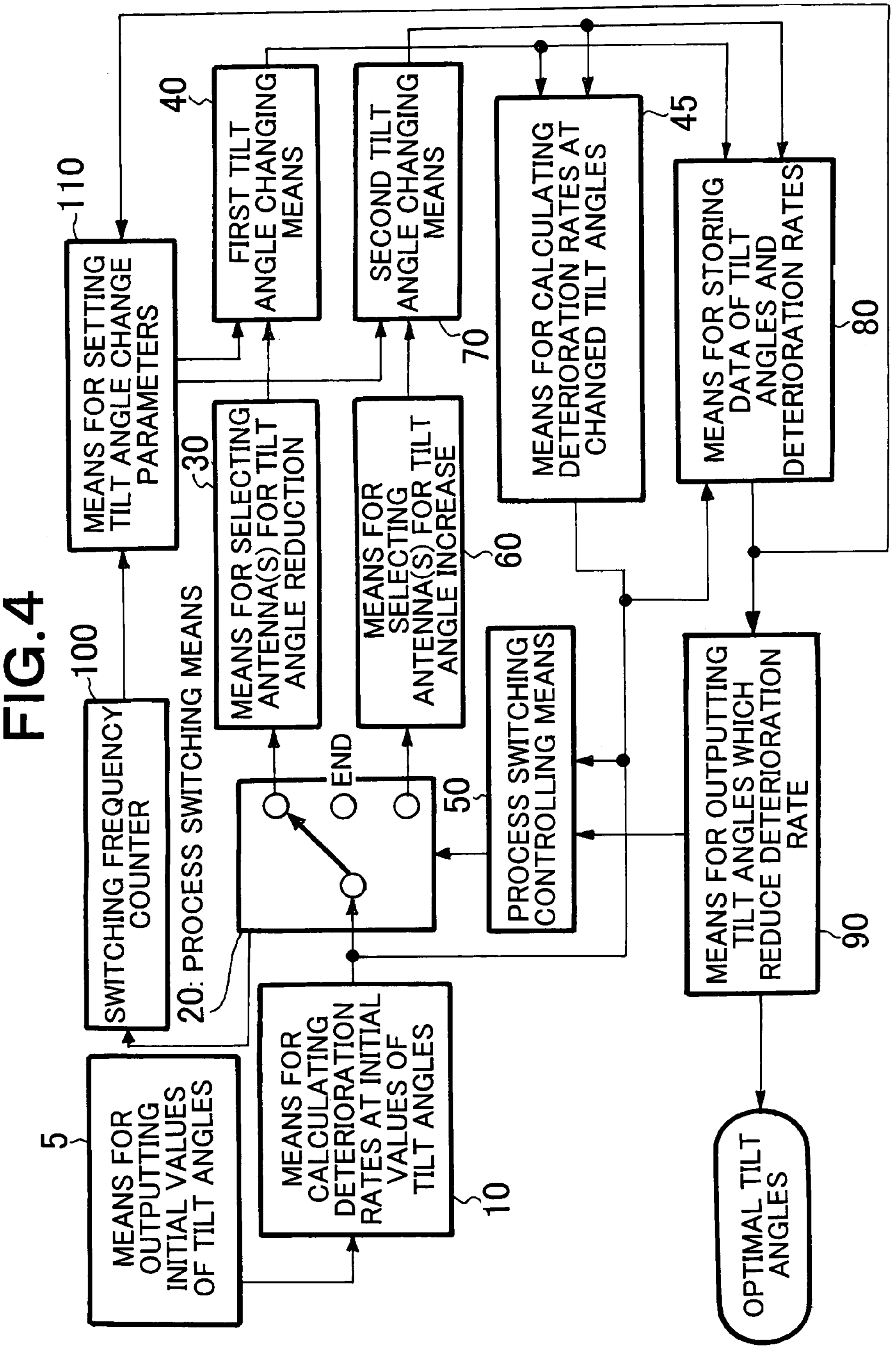
FIG. 4 is a system view of the second embodiment of the present invention.
Figure 5:
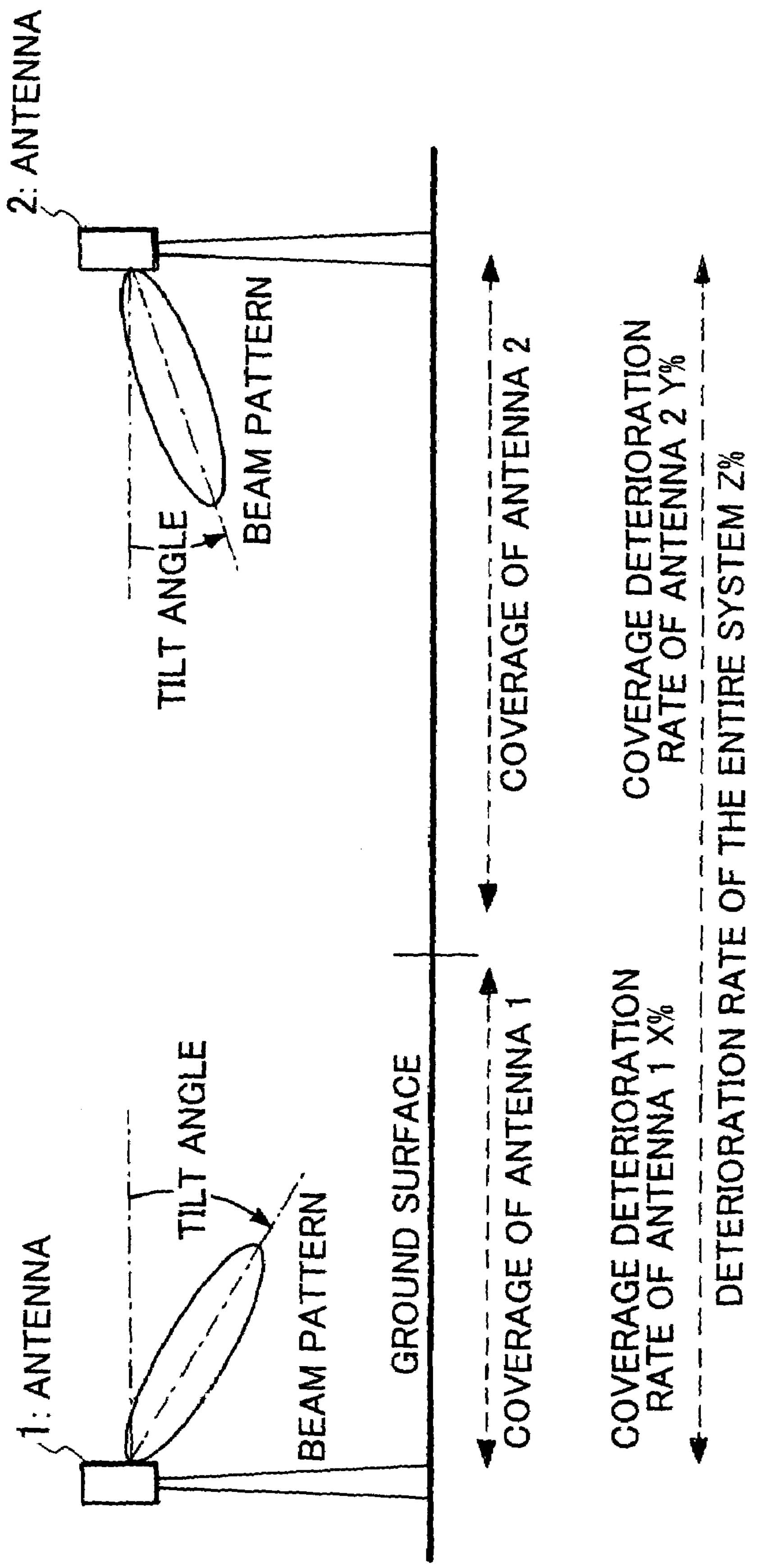
FIG. 5 is a schematic view showing adjustments of tilt angles of two antennas.

FIG. 4 is a block diagram showing the construction of a system which performs the process flowchart of FIG. 3. This construction is provided with a switching frequency counter 100 and means for setting tilt angle change parameters 110 in addition to the system construction of the first embodiment shown in FIG. 2. The switching frequency counter 100 counts switching information outputted from the process switching means 20. The means for setting tilt angle change parameters 110 set tilt angle change parameters for the first tilt angle changing means 40 and the second tilt angle changing means 70 by using information from the means 80 for storing data of tilt angles and deterioration rates once frequency of switching reaches a given number of times. Other parts of the construction are similar to those shown in FIG. 2 and descriptions thereof are thus omitted.

The switching frequency counter 100 counts switching information outputted from the process switching means 20 and provides the means for setting tilt angle change parameters 110 with a start-up instruction once frequency of switching reaches a given number of times.

In accordance with the start-up instruction from the switching frequency counter 100, the means 110 for setting tilt angle change parameters sets a degree of the next tilt angles change to a half (for example, 0.5 degrees) of the degree for tilt angle change (for example, 1.0 degree) in the last parameter set for the first tilt angle changing means 40. Further, the means for setting tilt angle change parameters 110 receives tilt angles, coverage deterioration rates of respective antennas and a deterioration rate of the entire system as inputs, which are calculation results in the past outputted from the means 80 for storing data of tilt angles and deterioration rates. Based on this input data, the means for setting tilt angle change parameters 110 then sets a range of tilt angle change between a tilt angle that has realized the smallest deterioration rate of the entire system so far and a tilt angle that has realized the second smallest deterioration rate of the entire system.

At the same time, in accordance with a start-up instruction from the switching frequency counter 100, the means 110 for setting tilt angle change parameters sets a degree of the next tilt angle change to a half (for example, 0.5 degrees) of the degree for tilt angle change (for example, 1.0 degree) in the last tilt angle change parameter set for the second tilt angle changing means 70. Further, the means 110 for setting tilt angle change parameters receives tilt angles, coverage deterioration rates of respective antennas and a deterioration rate of the entire system as inputs, which are calculation results in the past outputted from the means 80 for storing data of tilt angles and deterioration rates. Based on this input data, the means 110 for setting tilt angle change parameters then sets a range of tilt angle change between a tilt angle that has realized the smallest deterioration rate of the entire system so far and a tilt angle that has realized the second smallest deterioration rate of the entire system.

Operations of the rest of the second embodiment of the present invention are the same as those of the first embodiment. An added operation is that the means 110 for setting tilt angle change parameters starts up once the switching frequency counter 110 has counted a given accumulated number of times of switching. After the start-up, the means 110 for setting tilt angle change parameters sets tilt angle change parameters for the first tilt angle changing means 40 and the second tilt angle changing means 70.

In addition to the working effects of the first embodiment, the second embodiment has a working effect that tilt angles can be decided more quickly and accurately.

This is because, in the second embodiment, a degree for tilt angle change is large at the beginning whereby only a small number of changes are required until tilt angles become close to optimum values. In other words, the duration of the process is shorter, allowing tilt angles to be close to optimal values more quickly. Subsequently, a degree of angle change is set smaller, thus reducing deviations between changed tilt angles and optimum values. Hence, tilt angles, which are closer to optimum values and thus accurate, can be obtained. Furthermore, since a range of tilt angle change is limited to a range between a tilt angle that has realized the smallest deterioration rate of the entire system in the hitherto processes and a tilt angle that has realized the second smallest of the entire system, a frequency of tilt angle changes can be reduced. In other words, a process duration becomes shorter, thus allowing tilt angles to become close to optimal values more quickly. Accordingly, a deterioration rate can be reduced further in the same period of time in comparison with the first embodiment.

The present invention can be used to decide tilt angles of antennas so that a deterioration rate of the entire radio communication system is reduced.

What is claimed is:

1. A method for deciding tilt angles of antennas having directivity in a vertical plane, which are provided in a plurality of radio base stations constituting a radio communication system, said method comprising:

a first step of selecting an antenna whose tilt angle is to be reduced;

a second step of calculating a deterioration rate of the system more than once, by changing the tilt angle, at the time when a tilt angle of the antenna selected in the first step is reduced;

a third step of selecting an antenna whose tilt angle is to be increased;

a fourth step of calculating a deterioration rate of the system more than once, by changing the tilt angle, at the time when a tilt angle of the antenna selected in the third step is increased;

a fifth step of outputting the tilt angle corresponding to the smallest deterioration rate in the deterioration rate of the system calculated in the second step and the deterioration rate of the system calculated in the fourth step a sixth step being performed after the first step and the second step, wherein it is determined whether processes of the first step and the second step are to be repeated;

a seventh step being performed after the third step and the fourth step, wherein it is determined whether processes of the third step and the fourth step are to be repeated; and wherein the deterioration rate is a ratio of the points where reception power or quality is lower than a predetermined value within specified coverage.

2. A method for deciding tilt angles of antennas of a radio communication system according to claim 1, further comprising:

an eighth step being performed after the first step to the seventh step, wherein it is determined whether processes of the first step to the seventh step are to be repeated.

3. A method of deciding tilt angles of antennas of a radio communication system according to claim 2, further comprising;

a ninth step being performed right before the first step wherein a step angle being used for changing a tilt angle in the second step is changed in accordance with the accumulated number of times of repetitions of the processes if it is determined in the eighth step that the processes of the first step to the seventh step are to be repeated.

4. A method of deciding tilt angles of antennas of a radio communication system according to claim 3, further comprising;

a tenth step being performed right before the third step wherein a step angle being used for changing a tilt angle in the fourth step is changed in accordance with the accumulated number of times of repetitions of the processes if it is determined in the eights step that the processes of the first step to the seventh step are to be repeated.

5. A method of deciding tilt angles of antennas of a radio communication system according to claim 4, wherein one of or both of the first step of selecting an antenna for reducing the tilt angle and the third step of selecting an antenna for increasing the tilt angle selects or select antennas based on deterioration rates of coverage of the antennas, respectively.

6. A method of deciding tilt angles of antennas of a radio communication system according to claim 3, wherein one of or both of the first step of selecting an antenna for reducing the tilt angle and the third step of selecting an antenna for increasing the tilt angle selects or select antennas based on deterioration rates of coverage of the antennas, respectively.

7. A method of deciding tilt angles of antennas of a radio communication system according to claim 2, further comprising;

a tenth step being performed right before the third step wherein a step angle being used for changing a tilt angle in the fourth step is changed in accordance with the accumulated number of times of repetitions of the processes if it is determined in the eights step that the processes of the first step to the seventh step are to be repeated.

8. A method of deciding tilt angles of antennas of a radio communication system according to claim 7, wherein one of or both of the first step of selecting an antenna for reducing the tilt angle and the third step of selecting an antenna for increasing the tilt angle selects or select antennas based on deterioration rates of coverage of the antennas, respectively.

9. A method of deciding tilt angles of antennas of a radio communication system according to claim 2, wherein one of or both of the first step of selecting an antenna for reducing the tilt angle and the third step of selecting an antenna for increasing the tilt angle selects or select antennas based on deterioration rates of coverage of the antennas, respectively.

10. A method of deciding tilt angles of antennas of a radio communication system according to claim 2, wherein one of or both of the first step of selecting an antenna for reducing the tilt angle and the third step of selecting an antenna for increasing the tilt angle selects or select antennas based on deterioration rates of coverage of the antennas, respectively.

11. An apparatus for deciding tilt angles of antennas having directivity in a vertical plane, which are provided in a plurality of radio base stations constituting a radio communication system, said apparatus comprising:

first antenna selecting means for selecting an antenna whose tilt angle is to be reduced;

second antenna selecting means for selecting an antenna whose tilt angle is to be increased;

deterioration rate calculating means for calculating a deterioration rate of the system after a tilt angle of the antenna selected by the first antenna selecting means or the second antenna selecting means is changed, said deterioration rate being calculated at least once after a tilt angle is changed;

data storage means for storing the deterioration rate calculated by the deterioration rate calculating means and tilt angles associated therewith; and means for outputting tilt angles realizing the smallest deterioration rate of the system from data of the tilt angles and deterioration rates stored in the data storage means wherein the deterioration rate is a ratio of the points where reception power or quality is lower than a predetermined value within specified coverage.

12. An apparatus for deciding tilt angles of antennas of a radio communication system according to claim 11, wherein one of or both of the first antenna selecting means and the second antenna selecting means select antennas based on deterioration rates of coverage of the antennas.

13. An apparatus for deciding tilt angles of antennas of a radio communication system according to claim 12, further comprising:

process switching means for outputting information on switching among an operation by the first antenna selecting means, an operation by the second antenna selecting means, and termination of processes;

a switching frequency counter for counting the information on switching outputted from the process switching means; and means for setting tilt angle change parameters which changes a degree of tilt angle change for an antenna selected by the first antenna selecting means or the second antenna selecting means once frequency of switching counted by the switching frequency counter is a predetermined number or larger.

14. An apparatus for deciding tilt angles of antennas of a radio communication system according to claim 11, further comprising:

process switching means for outputting information on switching among an operation by the first antenna selecting means, an operation by the second antenna selecting means, and termination of processes;

a switching frequency counter for counting the information on switching outputted from the process switching means; and means for setting tilt angle change parameters which changes a degree of tilt angle change for an antenna selected by the first antenna selecting means or the second antenna selecting means once frequency of switching counted by the switching frequency counter is a predetermined number or larger.

* * * * *